L. WOJIDKOW.
COFFEE PERCOLATOR.
APPLICATION FILED FEB. 20, 1911.
1,036,767.
Patented Aug. 27, 1912.
3 SHEETS—SHEET 1.
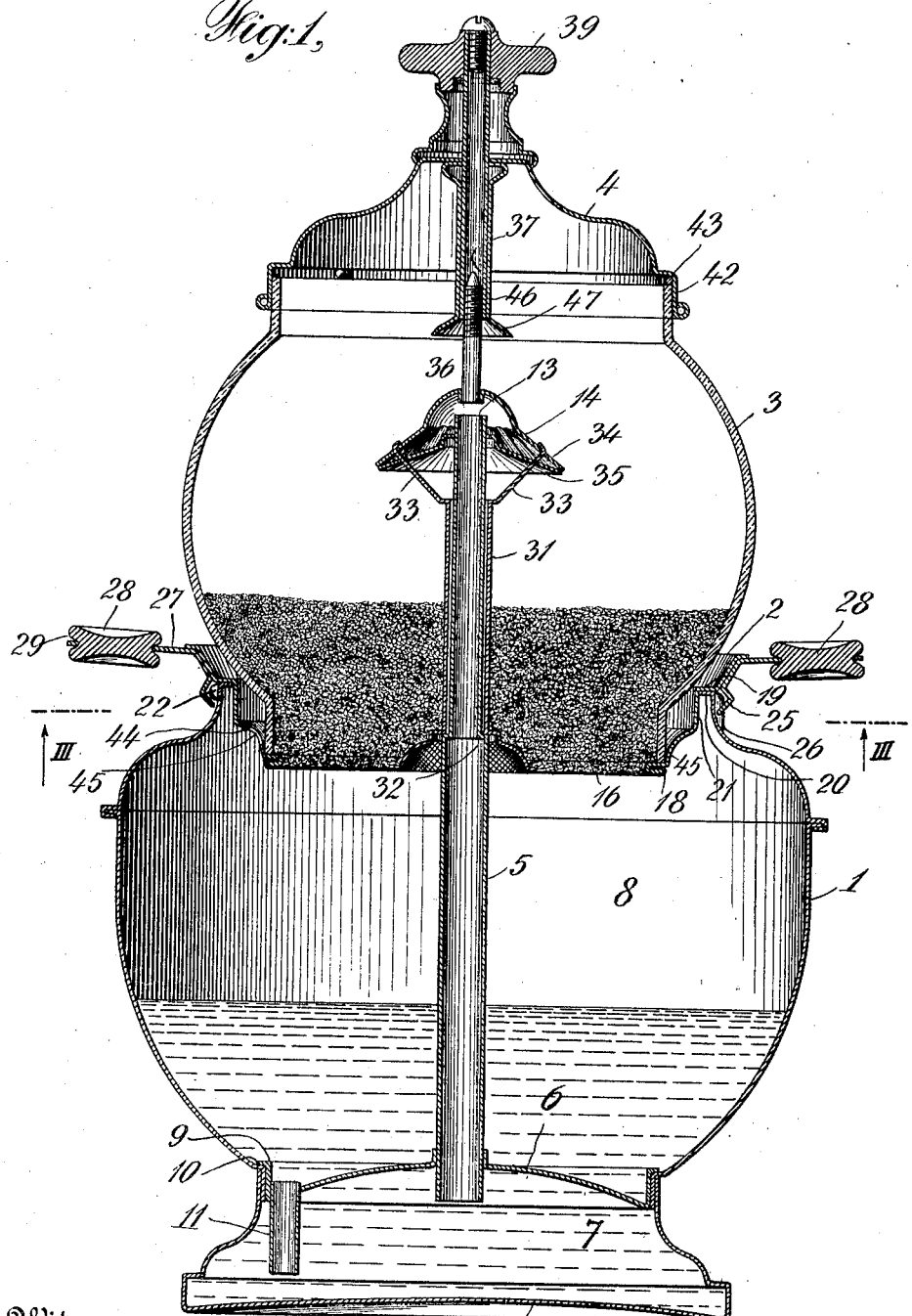

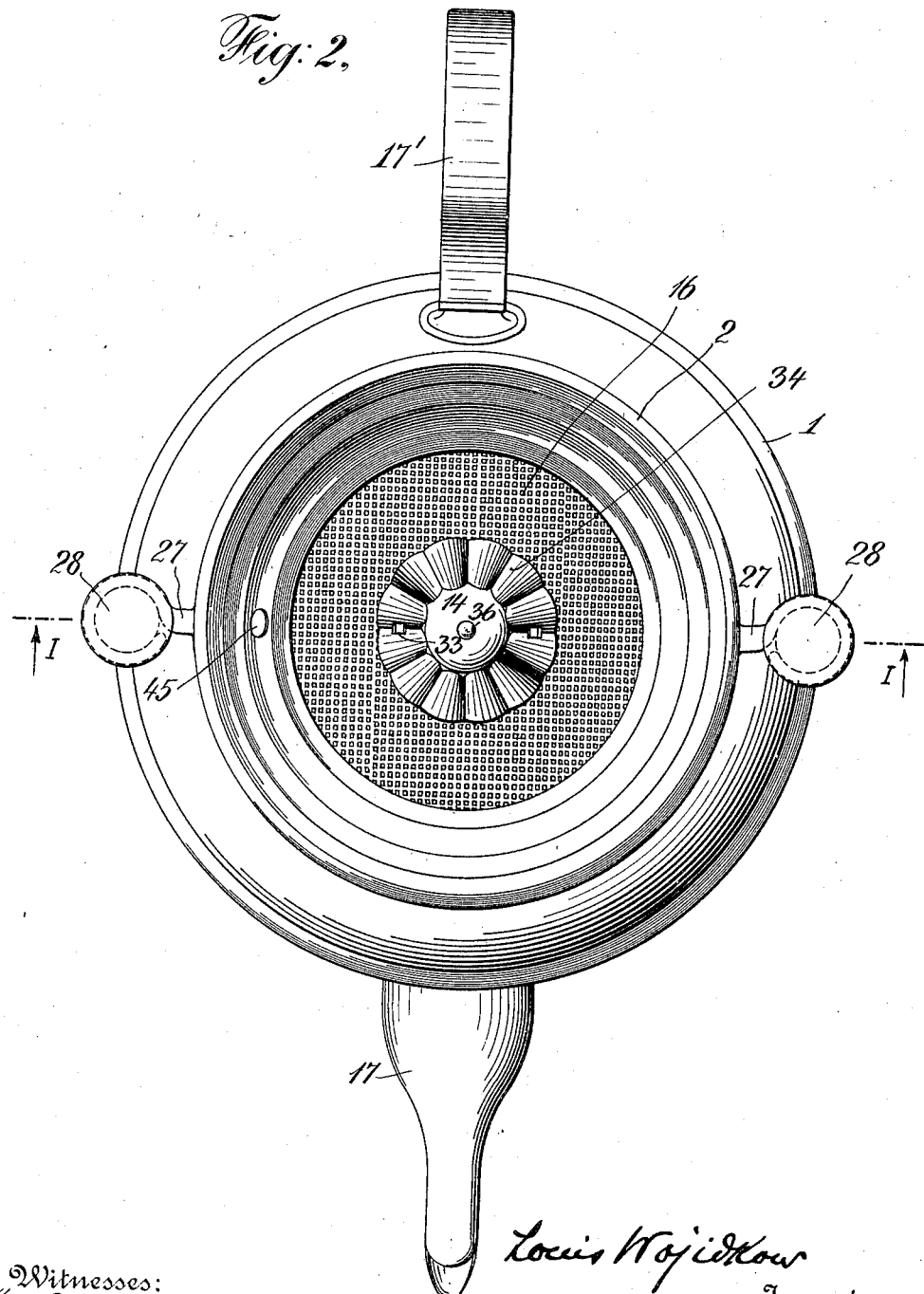

L. WOJIDKOW.
COFFEE PERCOLATOR.
APPLICATION FILED FEB. 20, 1911.
1,036,767.
Patented Aug. 27, 1912.
3 SHEETS—SHEET 3.
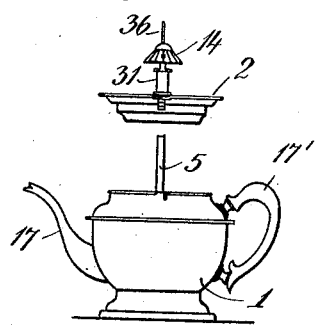
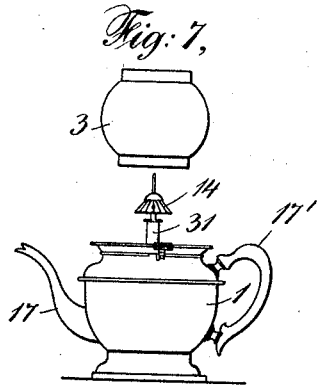
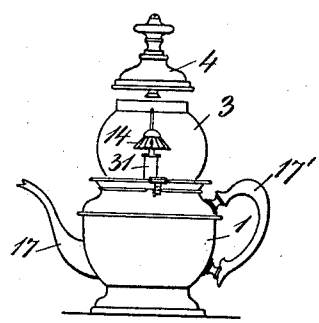
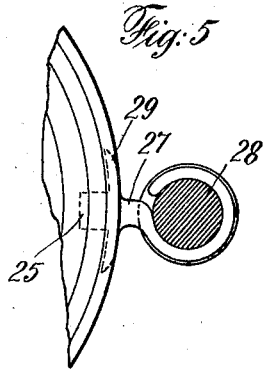
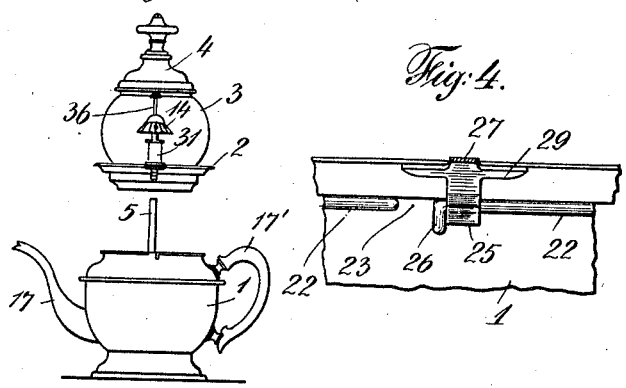
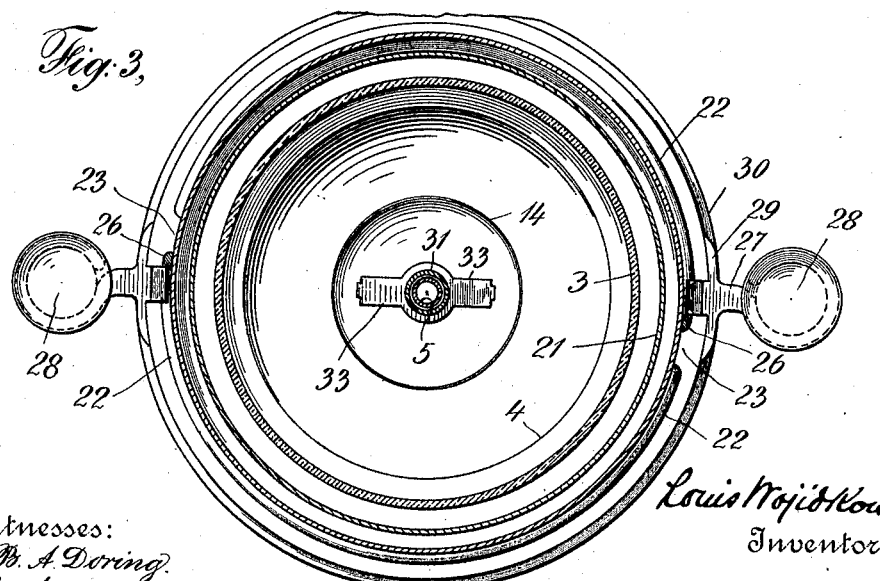
Witnesses:
Max B. A. Doring.
H. G. Kimball
Louis Wojidkow
Inventor
By Attorney

UNITED STATES PATENT OFFICE.

LOUIS WOJIDKOW, OF BROOKLYN, NEW YORK, ASSIGNOR TO NEW YORK STAMPING COMPANY, OF BROOKLYN, NEW YORK, A CORPORATION OF NEW YORK.

COFFEE-PERCOLATOR.

1,036,767.      Specification of Letters Patent.      Patented Aug. 27, 1912.

Application filed February 20, 1911. Serial No. 609,613.

*To all whom it may concern:*

Be it known that I, LOUIS WOJIDKOW, a citizen of the United States, residing at Brooklyn, in the county of Kings and State of New York, have invented certain new and useful Improvements in Coffee-Percolators, of which the following is a full and concise specification.

The invention is a coffee percolator and consists in the arrangement, form and combination of parts to provide a portable percolator, the several parts of which when assembled may be handled as a unit without risk of the coffee container becoming accidentally separated from the liquid reservoir, or from the strainer, or of the cover becoming separated from the coffee container, the said parts being all positively held together.

It is a further object of the invention to provide a percolator in which the coffee container is readily separable from the strainer and the container cover capable of adjustable connection to the strainer whereby the container may be clamped between the strainer and the cover; also to provide a form of bayonet joint connection between the pot and strainer, whereby the latter with its attached parts may be readily seated upon and removed from the pot, and when in place on the pot is securely locked thereto.

More specifically, the invention comprises a novel means in combination with the bayonet joint connection referred to, whereby the locked and unlocked positions of the pot and strainer are mechanically ascertained; a novel form of spreader or sprinkler for spraying the liquid over the coffee; a novel mode of attachment of the spreader to the strainer and to the cover, and a means for draining into the pot any water of condensation or liquid from other source, which may be on the outside of the coffee container.

These and other objects and features of the invention will more fully appear in connection with the description of the apparatus shown in the accompanying drawings, in which:

Figure 1 is a central vertical section of the assembled percolator taken on the line I—I of Fig. 2. Fig. 2 is a top plan showing the filter tray and attached spreader, in position on the pot; the globe and cover being removed. Fig. 3 is a view in cross section through the assembled percolator on the line III—III of Fig. 1 looking up. Fig. 4 is a detail view in side elevation illustrating the bayonet joint connection of the filter tray to the pot. Fig. 5 is a detail top plan, partly in section, of one of the tray handles, showing the attachment of the same to the tray and the clip or projection thereon which forms part of the bayonet joint connection shown in Fig. 4. Fig. 6 is an elevation showing the pot with the circulating tube in position therein and the filter tray about to be passed onto the tube and onto its seat on the pot. Fig. 7 is an elevation showing the filter tray with the spreader in position on the pot, and showing the globe about to be passed over the spreader and onto its seat on the filter tray. Fig. 8 is an elevation showing all parts assembled except the cover, which latter is about to be screwed down into place on the globe by means of a screw attached to the spreader. Fig. 9 is an elevation showing the globe clamped between the cover and tray, and the two latter screwed together, so that all three as a unit may be removed from or placed on the pot, which is also shown.

The percolator as shown is composed of five separable pieces or sections, to wit: a pot or reservoir 1 for the liquid, a filter tray or strainer 2 supported on the pot, a globe or coffee container 3 supported on the filter tray and usually made of glass, a cover 4 closing the top of the globe, and a tubular member 5 within the pot for causing the circulation of the liquid. These pieces are assembled and locked together so as to form in effect a unitary structure, in which none of the parts can be accidentally disconnected from any of the others even though the percolator be upset or turned upside down, while the globe or coffee container itself is clamped by and between the cover and the filter tray in such manner that these three elements alone may be treated as a unit, and as such, removed therefrom, or placed upon and locked to the pot.

The pot 1 is divided by a disk or plate 6, into a lower chamber 7, which by virtue of its proximity to the fire constitutes a prime steam generating chamber and an upper chamber 8, which serves as the reservoir for the liquid. The plate 6 as usual is rigid with and supports the tubular member 5 and rests by means of a shouldered annular flange 9, upon a shoulder 10 formed on the inside of the pot. The chambers 7 and 8 communicate through a short pipe 11 which passes through the plate 6, opening at its upper end into the chamber 8 and at its lower end into the chamber 7 near the bottom of the latter. The chamber 7 is flared outward from top to bottom to provide a large bottom or heating surface 12, thereby adapting the percolator for use in a stove of any kind.

Liquid entering chamber 7 from chamber 8 by way of the pipe 11 is led by the latter to the bottom 12 of the pot where it is highly heated and in part turned to steam, which rises in the tube 5 carrying with it some of the liquid from the steam chamber. The tube 5 opens at its upper end 13 into the container 3 above the level of the coffee or other substance therein from which the infusion is to be prepared. Within the container and opposite the open end of tube 5 is a spreader or deflector 14 against which the stream of liquid delivered from the tube 5 is projected and by means of which it is subdivided and sprayed over the coffee passing through the latter and through the filter tray or strainer 16 on which the coffee is supported, into the upper chamber 8 of the pot 1, thence again passing into chamber 7 and up tube 5, repeating the circuit as long as steam is generated or until the liquid is drawn off. For drawing off the liquid there is shown a spout 17, but it will be understood that in place of the spout there may be substituted a faucet or any other suitable tap. The pot has a handle 17' of any suitable design.

The filter 16 may be a wire netting secured to the body of the filter tray 2 as by means of a crimp 18, or it may be a foraminated plate integral with or otherwise secured to the tray body. While the coffee container 3 is preferably made of glass as shown in the drawings, it may be of any suitable material and it is desirably formed with substantially cylindrical seating lips or margins at its opposite ends, of equal diameter, and approximately equal to the diameter of the foraminous surface of the filter tray upon which it is seated. The filter plate is flat so that when the globe is placed therein the coffee grains will not leak out into the tray or pot. The tray body or rim slopes upward and outward from the globe seat on the filter plate, and comprises a flat, horizontal, shoulder or flange 19 by which the tray is supported on an inward turned flat flange 20 formed on the rim of the pot, the bearing thereon being continuous around the circumference of the pot and uninterrupted by the devices for locking the tray to the pot. The shoulder 19 is sufficiently remote from the globe 3 to permit water of condensation collecting on the outside of the globe to pass down to the base of the globe. Between the shoulder 19 and the filter plate 16 the tray is preferably shaped to have a vertical or cylindrical portion 21 and an inclined portion 41. The vertical part 21 is of diameter to fit fairly snugly with the flange 20 of the pot, and its vertical dimension is predetermined with reference to the parts of the bayonet joint for a purpose that will appear below. The inclined portion forms with the cylindrical portion of the globe a trough 44 in which liquid passing down the outside of the globe, or liquid leaking under the globe from the inside thereof, may collect. A hole 45 through the wall 41 provides for drainage into the pot of any liquid in the trough 44. The inclined wall 41 further serves to guide the globe to its seat on the tray.

The bayonet joint attachment of the tray to the pot is provided in part by an annular bead or flange 22 (see Figs. 1 and 4) on the outside of the pot near the top thereof, which is interrupted or discontinued at diametrically opposite points 23 (see Fig. 3), so that in effect there are two semi-annular beads. A pair of clips 25 is secured by means of arms or fins 29 to the under side of the tray rim at diametrically opposite points of the same. These clips are of less width than the interruptions or openings 23 of the bead 22, so that they may enter the same, and their ends are turned inward to interlock with the bead, so that they cannot be forced over it. To seat the tray in the pot it is placed therein with its cylindrical wall 21 entered within the pot opening and the ends of the clips resting on top of the beads 22. Then, by rotating the tray as thus placed, the clips 25 ride on the beads until they drop through the openings 23, which allows the flange 19 above referred to to come into its bearing on the pot flange 20, and when further rotated the clips will embrace the beads and thus secure the tray to the pot body. It will be seen that the vertical wall 21 is longer than the width of the bead 22, so that it will form a bearing in the pot opening to guide and support the tray in its rotary movement before the clips have entered the openings 23. The bead at one side of each of the openings 23 has a downward turn or offset 26, so that, after the tray has been seated and turned 180°, the clips 25 strike and are stopped by offsets 26, to prevent further rotation of the tray and indicate that the tray is securely locked to the pot. To remove the tray from the pot, the operation is reversed, that is to say the tray is turned counter-clockwise until, after a 180° turn, the clips strike the other sides of the offsets 26, being thereby arrested in the position in which they register with the openings 23, whereupon the tray may be lifted off of the pot. Quick and certain attachment and detachment of the parts is thus provided, and it will be noted that the presence of the offsets 26, provides for a mechanical, as distinguished from a mere visual, indication of the locked and unlocked positions of the tray. It will be understood however that the construction of the bayonet joint may be considerably varied, and that no matter how modified, the structure will nevertheless fall within the scope of this invention if the attachment to the pot is by means of a bayonet joint or has the distinguishing characteristics thereof.

In the preferred form the bayonet joint clips 25 are extended upwardly as integral arms 27 which are bent or girdled around buttons 28 of heat insulating material, fitting grooves 29 therein and forming suitable handles therewith, by which the tray may be lifted. It is of advantage to make the clips and handle arms in a single piece, since by a single operation both may be stamped, and likewise by a single operation attached to the tray. Furthermore the two elements being in one, each provides an enlarged bearing for the other on the tray, and the attachment of each is thus rendered the more secure. The tray handles may however be separate from the clips of the bayonet joint, and in certain forms of the invention it may be preferable to construct and attach the two separately.

Attached to the strainer tray at a point in alinement with the tube 5 is a tubular member 31 for supporting the spreader 14 above referred to and for connecting the strainer with the cover 4. The diameter of the tube 31 permits it to be passed over the tube 5, and the latter is of reduced diameter for the portion thereof within the tube 31; the point of reduction in diameter presenting a shoulder 32 which serves as an additional support for the tray.

The spreader 14 is supported on the divergent arms 33 rigidly secured to the top of the tube 31, and comprises two conical or dome shaped plates 34 and 35, of different pitch, the upper resting at its periphery on the lower, so as to form between central portions of the plates, a receiving chamber into which the pipe 5 opens. The upper plate 34 (see Fig. 2) has a skirt which is radially corrugated or fluted and the lower plate has a plain conical surface, so that between the two plates there is formed a system of radially divergent channels, tapering toward the peripheries of the plates, whereby the liquid is sprayed in all directions over the coffee from the center of the globe to the walls thereof. The spreader supporting arms 33 are shown as passing through both plates 34 and 35 and as turned over at their ends against the upper side of plate 34, but other secure means of attachment of the spreader to the tube 31, may be employed with equal effect.

Rigidly secured to the top of the spreader, centrally of the globe 3, is an upright stud or screw 36 adapted to be engaged by a corresponding female screw or internally threaded sleeve 37 attached to and depending rigidly from the inside of the cover 4 centrally of the latter. The cover has a suitable handle 39 whereby it can be readily rotated to screw the sleeve 37 down onto the screw 36 so as to seat the cover on the globe and clamp the latter between the cover and the tray. The threaded sleeve 37 is fitted within an outer sleeve 46 which terminates in a flared portion 47 protruding below the end of sleeve 37 for the purpose of centering the screw 36 with the sleeve 37, and for further facilitating the alinement of the two screws, the screw 36 is provided with a pointed or rounded tip. The cover has a depending flange 42 adapted to embrace the globe, and has a shoulder 43 which may sit directly upon the upper edge of the globe, or between which and the globe may be interposed lugs 43 attached to the cover and serving as a restricted and easy bearing for the cover on the globe when the cover is being turned onto the screw 36.

It will be noted that the percolator above described does not depend on frictional engagement to hold the globe to the tray nor the cover to the globe; nor upon springs or similar attaching devices likely to get distorted and out of order. The globe is positively held to the tray, and consequently to the pot when the tray is locked to the latter, and similarly the cover is positively locked to the globe. No part can be withdrawn from the other unless the parts have previously been unlocked, and to make certain that the parts are locked before manipulating the apparatus, the screws on the tray and cover are made long enough to engage before the cover seats on the glass, thus causing the cover to sit obliquely and uncertainly on the device, indicating thereby its unlocked condition. The pot may be readily disconnected from the tray and the other parts without dismantling the latter, and it is an advantage of the new construction that the pot and tray can be disconnected more readily than the cover can be disconnected from the globe, for it is the custom to charge or recharge percolators of this general type with water that has been already heated and which if poured into the glass globe is most likely to crack it. The screw fastening of the cover, while having a quick pitch, nevertheless requires several complete revolutions to become unfastened, while the tray requires only a half revolution and moves easily, so that the water, whether hot or cold, will be most readily and naturally poured directly into the pot rather than into the glass globe. The globe, moreover, is of a shape that it can be cheaply produced and is adapted to be used either end up, regardless of whether it fits the tray accurately or not, and is also very easily cleaned, since it can be so readily disconnected.

I claim:

1. In a coffee percolator, a pot or reservoir for the liquid, a filter tray upon the pot, a coffee container open at both ends, separable from the tray and supported thereon, a cover for the coffee container, and means for detachably securing the container cover to the tray with the container locked between the two.

2. In a coffee percolator, a pot or reservoir for the liquid, a filter tray seated on the pot, a coffee container open at its bottom and seated on the tray so as to be supported by the latter on the pot, the container being removable from the tray, and means engageable with the upper part of the container to clamp the container down upon the tray.

3. In a coffee percolator, a pot for the liquid, a filter tray supported on the pot, a coffee container open at both ends, separable from the tray and supported thereon, a cover for the coffee container, and a screw connection for detachably securing the cover to the tray with the container therebetween.

4. In a coffee percolator, a pot for the liquid, a strainer, means for detachably securing the strainer to the pot, a coffee container open at both ends, separable from the strainer, a cover for the coffee container, and means for detachably securing the container cover to the strainer with the container locked between the two.

5. In a coffee percolator, a pot for the liquid, a strainer, a coffee container open at both ends separable from the strainer, a cover for the coffee container, means for detachably securing the container cover to the strainer with the container locked between the two, and means whereby the strainer with the coffee container and cover may as a unit be secured to and removed from the pot.

6. In a coffee percolator, a pot for the liquid, a filter tray having a bayonet joint connection to the pot, a coffee container open at both ends separable from the tray and supported thereon, a cover for the coffee container, and means for detachably securing the container cover to the tray with the container therebetween.

7. In a coffee percolator, a filter tray, a coffee container open at both ends, separable from the tray and supported thereon, a cover for the coffee container, a screw fast to the tray and threaded means integral with and located centrally of the cover for engaging said screw so that the cover may be screwed down upon the container and the latter thus clamped between the cover and the tray.

8. In a coffee percolator, a pot for the liquid, a filter tray demountably carried by the pot, the filter tray having a projection which depends within the pot opening, and a bayonet joint connection in part formed on the pot and in part on the tray, for locking the pot and tray together, said depending projection on the tray being of sufficient length to serve as a centering means for the tray on the pot before the members of the bayonet joint connection can be brought into coöperation with each other, in combination with means for confining coffee on the tray, and means for producing circulation of the liquid therethrough.

9. In a coffee percolator, a pot for the liquid, a strainer demountably carried by the pot and means for locking the strainer to the pot, said locking means being comprised in part of a circumferential bead or flange on the pot which serves as a seat on which the strainer may ride when turned on the pot, the strainer being provided with one or more projections for supporting it on said bead, and the bead being discontinued at points on the circumference of the pot to permit said projections to drop lower than the bead, whereupon, upon further rotary movement of the strainer on the pot, the projections are carried under the bead and serve to prevent the strainer from being lifted from the pot except after proper rotary movement of the same.

10. In a coffee percolator, a pot for the liquid, a strainer demountably carried by the pot, and means for locking the strainer to the pot, said locking means being comprised in part of a circumferential bead or flange on the pot which serves as a seat on which the strainer may ride when turned on the pot, the strainer being provided with one or more projections for supporting it on said bead, and the bead being discontinued at points on the circumference of the pot to permit said projections to drop lower than the bead, whereupon, upon further rotary movement of the strainer on the pot, the projections are carried under the bead and serve to prevent the strainer from being lifted from the pot except after proper rotary movement of the same, and a stop in the path of the projection below the bead, to arrest rotation of the strainer on the pot, when the projection reaches the point where the bead is discontinued, thus determining the position from which the strainer is to be lifted in removing the same.

11. In a coffee percolator, a pot for the liquid, a strainer demountably carried by the pot, and means for locking the strainer to the pot, said locking means consisting of a bead or flange on the circumference of one of said elements, and coöperating projections on the other element, said projections engaging and bearing against said bead to support the strainer on the pot while permitting relative rotary movement of pot and strainer, and said bead being discontinued at points to permit passage of said projections to the other side of the bead, whereupon, upon further relative rotary movement of pot and strainer, said projections pass behind said bead on said other side thereof, and prevent lifting of the strainer from the pot.

12. In a coffee percolator, a pot or reservoir for the liquid, and a strainer having a bayonet joint connection with the pot or reservoir, said joint comprising a horizontal bead or flange on the pot which is interrupted at one or more points on the circumference of the pot to present opposed bead or flange extremities with spaces between the same, and one or more projections on the strainer, said projections being of less width than the spaces between the opposed flange or bead extremities, and abutting said bead or flange and to prevent seating or withdrawal of the strainer except when the strainer is turned to bring the projections thereon to points where the bead or flange is discontinued or interrupted, and offsets from said bead or flange which when engaged by said projections define the locked and unlocked positions of the strainer.

13. In a coffee percolator, a pot for the liquid, a strainer demountably carried by the pot, means for locking the strainer to the pot, said locking means being comprised in part of a circumferential bead or flange on the pot which serves as a seat on which the strainer may ride when turned on the pot, the strainer being provided with one or more projections for supporting it on said bead, and the bead being discontinued at points on the circumference of the pot to permit said projections to drop lower than the bead, whereupon, upon further rotary movement of the strainer on the pot, the projections are carried under the bead and serve to prevent the strainer from being lifted from the pot except after proper rotary movement of the same, and a seating surface, forming part of the strainer, to engage and ride on the upper side of said bead after said projections have passed to the lower side of the bead.

14. In a coffee percolator, a pot for the liquid, a strainer for supporting the coffee over the pot, and a handle for the strainer; the handle consisting of a horizontally disposed button or finger piece of heat insulating material having a peripheral groove, and a flat strip of metal, secured with one of its faces against the side of the strainer and encircling the button or finger piece, with one of its edges in the groove in the finger piece.

15. In a coffee percolator, a pot for the liquid, a strainer and a handle for the strainer consisting of a horizontally disposed button or finger piece of heat insulating material having a peripheral groove, and a flat strip of metal, secured with one of its faces against the side of the strainer and encircling the button or finger piece, with one of its edges in the groove in the finger piece, said metal strip of the handle having also a projection for interlocking the strainer with the pot body.

16. In a coffee percolator, a pot for the liquid, a filter tray and a coffee container thereon, a circulation tube extending from the interior of the pot, through the tray and terminating in the container, a spreader for the liquid emitted from the circulation tube, said spreader being situated in the container opposite the mouth of the circulation tube and supported on arms rigidly connected to the tray, in combination with means removably engaged with said spreader to hold the container to the tray.

17. In a coffee percolator, a pot for the liquid, a coffee container, a circulation tube extending from the pot into the container, and a spreader for the liquid therefrom, the spreader consisting of two conical or dome shaped plates of different pitch, the plate of greater pitch being placed above, and substantially in contact at its periphery with the lower plate, so that between the central portions of the plates there is a chamber, into which the circulating tube opens, one of the spreader plates being fluted or corrugated radially to provide divergent distributing channels through which the liquid is sprayed into the container.

18. In a coffee percolator, a pot for the liquid, a filter tray provided with an upstanding pipe, a circulation tube extending from the pot into the pipe, and a spreader for the circulated liquid supported on arms rigidly connected to said upstanding pipe, a glass globe on the tray, and a cover therefor having screw connection with the spreader.

19. In a coffee percolator, a pot for the liquid, a coffee container and strainer, a circulation tube extending from the pot through the strainer into the container, a spreader or deflector at the mouth of the tube consisting of two plates between which the circulating tube opens, a tubular member supported by the strainer and embracing the circulating tube, said tubular member having arms attached thereto, which arms pass through both of the spreader plates and are locked against the outer of the plates.

20. In a coffee percolator, a pot for the liquid, a coffee container and strainer, the container having an open upper end, a circulation tube extending from the pot through the strainer into the container, a spreader for the circulated liquid mounted within the container and provided with one of the members of an attaching device, and a cover for the container provided with a member complementary to the member provided by the spreader, the said members being adapted for mutual engagement when the cover and container are in normal position.

21. In a coffee percolator, a pot, a coffee container and strainer, a circulation tube extending from the pot through the strainer into the container, a spreader secured within the container, a threaded attachment member secured to the spreader, a cover for the container, a threaded member on the inside of the cover engaging the member on the spreader, one of said members having a flared extension for engaging and centering the same with the other.

22. In a coffee percolator, a pot for the liquid, a coffee container and strainer, a circulation tube extending from the pot through the strainer into the container, a spreader at the mouth of the tube, a screw secured to the opposite side of the spreader, a cover for the container, a tubular threaded member projecting from the inside of the cover toward the screw on the spreader and threaded onto said screw to secure the cover to the container, and means for causing the screw and threaded cover member to aline themselves when the cover is placed on the container.

23. In a coffee percolator, a pot for the liquid and a container for the coffee, a filter tray having a seat for the container within the pot, and formed with a rim or wall rising upwardly from the container and out of contact with the exterior thereof, said wall extending outwardly and forming a seat for the tray upon the pot rim.

24. In a coffee percolator, a pot for the liquid, a filter tray seated on the pot, and a coffee container carried by the filter tray, the tray having an upward and outward flared rim, removed at its periphery from the container to provide between it and the container a trough for the collection of waste liquid, and provided with a drainage hole from said trough into the pot.

25. In a coffee percolator, a pot for the liquid, a coffee tray connected thereto by a bayonet joint, a glass globe seated on the tray and a cover for the globe connected to the tray and globe open at both ends by a screw thread joint.

In testimony whereof, I have signed this specification in the presence of two witnesses.

LOUIS WOJIDKOW.

Witnesses:
FRED C. WOJIDKOW,
CLIFFORD H. KLOS.

---

Copies of this patent may be obtained for five cents each, by addressing the "Commissioner of Patents, Washington, D. C."